US006378392B1

(12) United States Patent
Dombrowski et al.

(10) Patent No.: US 6,378,392 B1
(45) Date of Patent: Apr. 30, 2002

(54) NON BINDING POWER ACTUATOR DRIVE ASSEMBLY

(75) Inventors: Douglas Dombrowski, Troy; Howard Warren Kuhlman, Rochester Hills; Lloyd Walker Rogers, Jr., Shelby Township; Michael G Wygle, Rochester, all of MI (US)

(73) Assignee: Delphi Technologies Inc., Troy, MI (US)

( * ) Notice: Subject to any disclaimer, the term of this patent is extended or adjusted under 35 U.S.C. 154(b) by 58 days.

(21) Appl. No.: 09/643,796

(22) Filed: Aug. 22, 2000

Related U.S. Application Data

(60) Provisional application No. 60/207,072, filed on May 25, 2000.

(51) Int. Cl.[7] ............................ B62D 25/10; F16H 1/04

(52) U.S. Cl. .......................... 74/422; 74/89.11; 49/339; 296/56

(58) Field of Search ................................ 74/422, 22 A, 74/22 R, 421 A, 89.11; 384/42; 49/339, 340, 341, 342, 346; 296/57.1, 106, 146.4, 56

(56) References Cited

U.S. PATENT DOCUMENTS 1,156,115 A * 10/1915 VanderHoef .............. 74/422 X
2,024,432 A * 12/1935 Curtis ......................... 384/42
3,054,645 A * 9/1962 Evans ......................... 384/42
3,350,143 A * 10/1967 Lichowsky .................. 384/42
5,118,204 A * 6/1992 Peters ......................... 384/42
5,267,796 A * 12/1993 Nonaka et al. ........... 384/42 X
5,390,557 A * 2/1995 Tsukada ................... 74/422 X
5,890,811 A * 4/1999 Bryson ........................ 384/42
5,896,703 A 4/1999 Wright et al. ................. 49/339
6,023,989 A * 2/2000 Imase et al. .................. 74/422
6,070,929 A * 6/2000 Barkley ........................ 296/76
6,092,336 A 7/2000 Wright et al. ................. 49/339
6,142,551 A * 11/2000 Ciavaglia et al. ...... 296/57.1 X
6,250,169 B1 * 6/2001 Weisser ..................... 74/89.17
6,256,928 B1 * 7/2001 Skeem ........................ 49/341
6,290,482 B1 * 9/2001 Glaesener et al. ........ 384/42 X

FOREIGN PATENT DOCUMENTS

JP 8-295255 * 11/1996

* cited by examiner

*Primary Examiner*—Lenard A. Footland
*Assistant Examiner*—Colby Hansen
(74) *Attorney, Agent, or Firm*—Patrick M. Griffin

(57) ABSTRACT

A drive assembly for a toothed rack and channel track type of power liftgate attaches the liftgate lift rod to the toothed rack indirectly, through a shoe-yoke assembly that transfers axial loads, but isolates the rack from non axial reactive loads transferred through the lift rod. A rigid yoke fits closely within axially spaced ends of a notch in the rack, but has a clearance elsewhere from the outside of the rack. The outside of the yoke is closely surrounded by a shoe, which provides a close fitting, slidable bearing layer with the inside of the channel track, maintaining the yoke to rack clearance. The maintenance of the yoke-rack clearance prevents the transmission of undesired reactive loads back to the rack through the yoke.

4 Claims, 5 Drawing Sheets

NON BINDING POWER ACTUATOR DRIVE ASSEMBLY

RELATED APPLICATION

This application claims priority from prior provisional patent application Serial No. 60/207,072 filed May 25, 2000.

TECHNICAL FIELD

This invention relates to power actuators for vehicle closure panels generally, and specifically to a non binding toothed rack and channel track type of drive assembly for a power actuator.

BACKGROUND OF THE INVENTION

More and more vehicles are incorporating power actuated closure panels, such as doors, hoods, trunk lids and rear liftgates. One such device particularly useful for a rear liftgate of the type found on minivans and SUVs is a stationary electric motor that turns a toothed wheel to slide an elongated toothed rack up and down inside a channel track. A link between the toothed rack and the liftgate pushes it up and open or swings in down and closed. Two such devices, one on each side, may be needed for large and heavy rear liftgates. Typically, the link between the power actuator and the rear liftgate is a rod that is attached at an upper end to the liftgate by a ball joint, and attached directly to the toothed rack by another ball joint at the lower end. The rod is subjected to shifting, twisting reactive loads as it moves up and down, and these are translated directly to the moving toothed rack sliding within the channel track. The non axial reactive loads tend to cause the rack to twist and bind within the channel track.

SUMMARY OF THE INVENTION

The subject invention provides an improved connection between the toothed rack and the lift rod that allows the toothed rack to slide within the channel track as it moves the lift rod up and down, but which prevents the lift rod from reacting on the toothed rack to bind it within the track.

In the embodiment disclosed, the toothed rack is thin enough and narrow enough to slide within the interior of the channel track with a significant clearance all the way around. A rigid yoke has a pair of side walls that straddle a notch in the upper surface of the rack, fitting closely into the axially spaced ends of the notch but spaced apart sufficiently to significantly clear the sides of the rack other than at the ends of the notch. A ball stud on the top of the yoke is pivotally joined to the lower end of the lift rod. An outer shoe of suitable bearing material, solid, but not as rigid as the yoke, surrounds the yoke, and fits closely to both the outer surface of the yoke and to the inner surface of the channel track. When the rack-yoke-shoe subassembly is installed in the channel track, the close fit of the shoe to both the inside of the track and the outside of the yoke maintains the yoke's clearance from the rack.

In operation, the yoke-shoe assembly slides closely back and forth within the track as the toothed wheel shifts the rack, with axial loads being efficiently transferred between the rack and yoke by the close fit to the ends of the rack notch. The all round clearance maintained by the shoe at all other points between the rack and yoke prevents non axial twisting loads from being transferred back from the yoke to the rack, however, so that the rack does not bind within the channel track. Twisting loads are instead transferred from the yoke, through the surrounding shoe, to the close fitting channel track.

BRIEF DESCRIPTION OF THE DRAWINGS

These and other features of the invention will appear from the following written description, and from the drawings, in which.

DESCRIPTION OF THE PREFERRED EMBODIMENT

Figure 1:
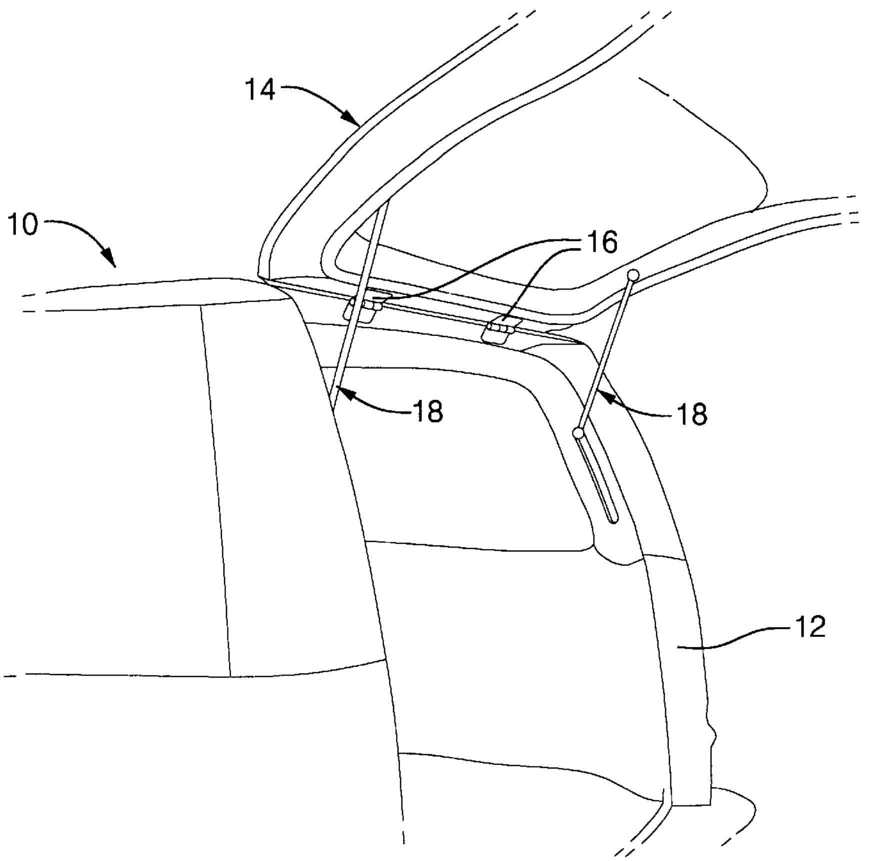
FIG. 1 is a perspective view of a part of a vehicle with a liftgate swung open.

Referring first to FIG. 1, the body of a vehicle such as a van or SUV 10 has a rear opening 12 closed by a closure panel such as a liftgate, indicated generally at 14. The top of liftgate 14 is pivoted freely to the vehicle to swing open and closed about a pair of hinges 16. Liftgate 14 is opened by one or more power actuators, indicated generally at 18. A pair of such is shown, one on each side, although smaller, lighter closures could make do with only one. Most of the mechanism of the power actuators 18 would be enclosed and concealed within the body trim, and is not visible in FIG. 1. A conventional hold open means, such as a gas spring, would typically be pivoted between liftgate 14 and the vehicle body 10, as well, but is not illustrated separately.

Figure 2:
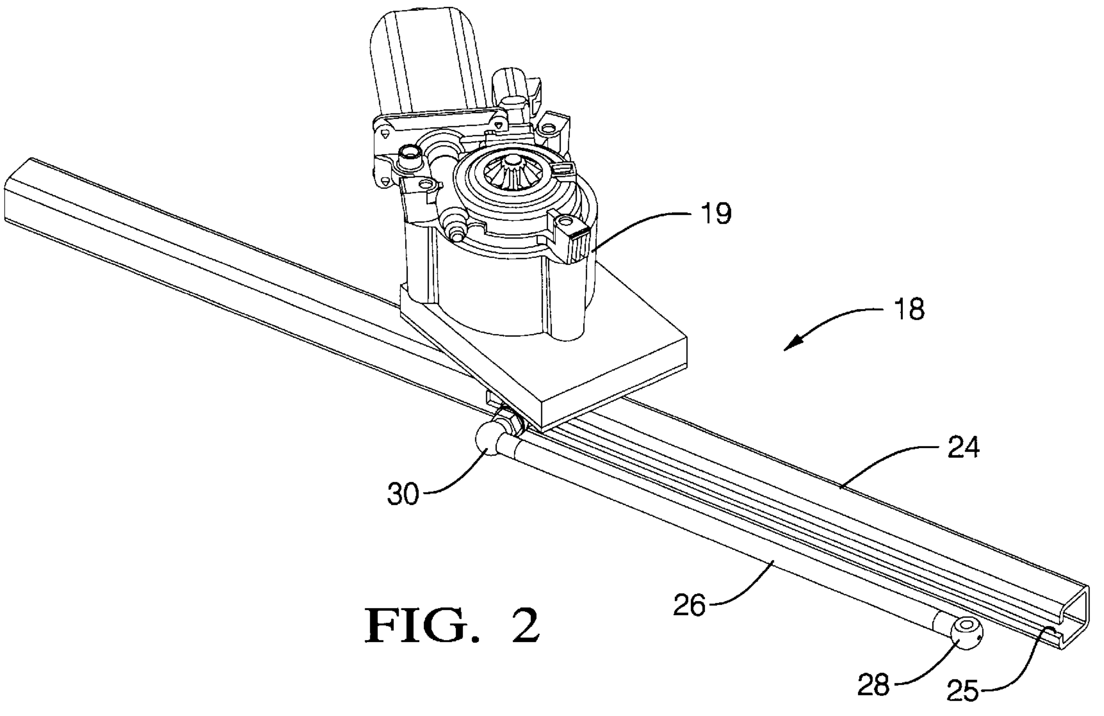
FIG. 2 is a perspective view of a power actuator's motor, lift rod and channel track removed from a vehicle.
Figure 3:
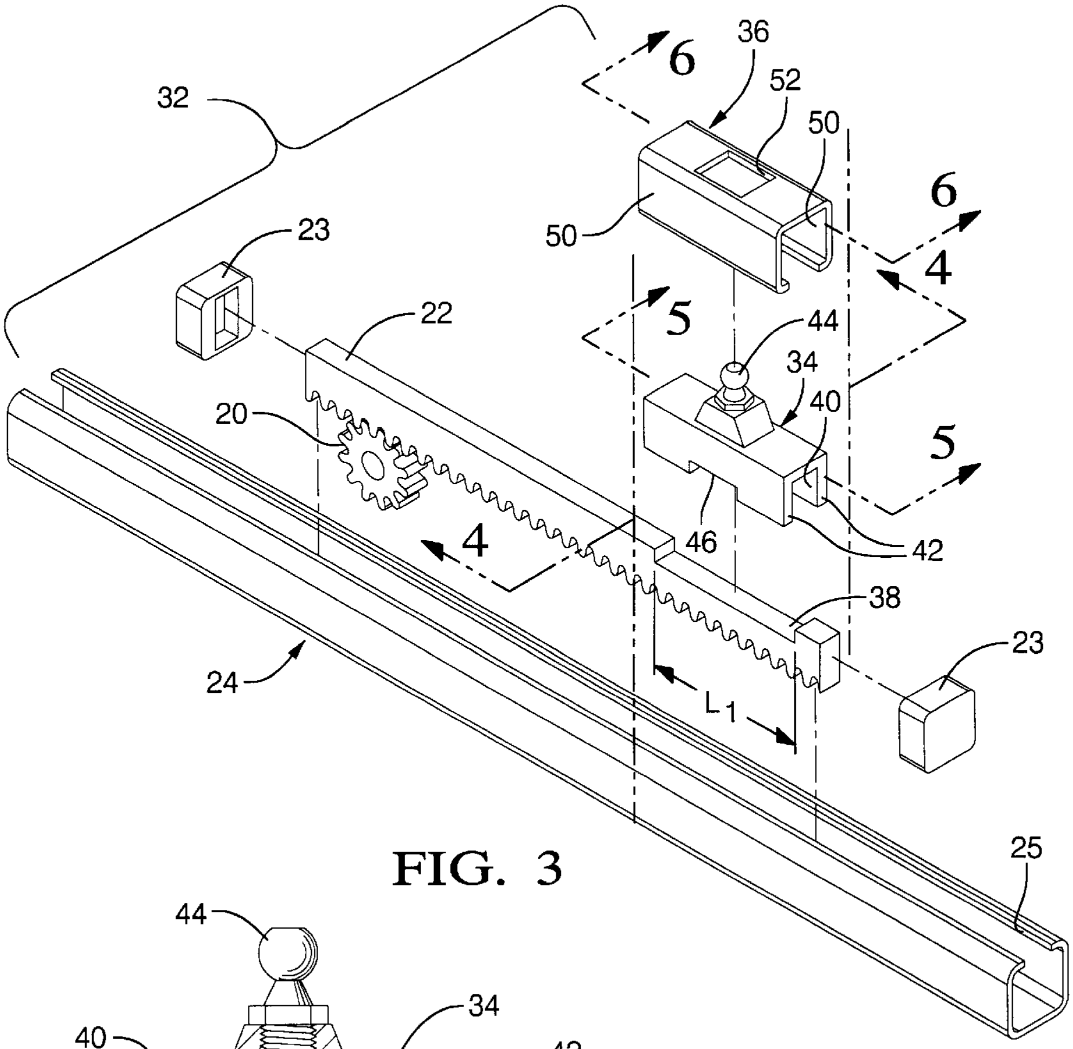
FIG. 3 is a perspective view of the various components of the drive assembly of the invention before assembly.

Referring next to FIGS. 2 and 3, power actuator 18 has an electric drive motor 19 which, through a suitable gear reduction mechanism, turns a toothed wheel 20 to drive a toothed rack 22 back and forth within a channel track 24, the end to end extent of which provides a defined axis along with the actuator 18 operates. End bearing blocks 23 of semi rigid plastic or other suitable material on rack 22 slide closely within channel track 24 to keep rack 22 aligned within channel track 24, as described in more detail below, and to keep the teeth of wheel 20 engaged with the teeth of rack 22. Channel track 24 has a smooth inner surface with a consistent, generally rectangular cross section all along its length, folded from steel sheet to leave a full length slot 25 at the top. A lift rod 26 is attached by a socket joint 28 to one side of liftgate 14. A socket joint 30 at the lower end of lift rod 26 is drivingly interconnected to rack 22 and channel track 24 by an assembly of rack 22, track 24, and other components, described next.

Figure 4:
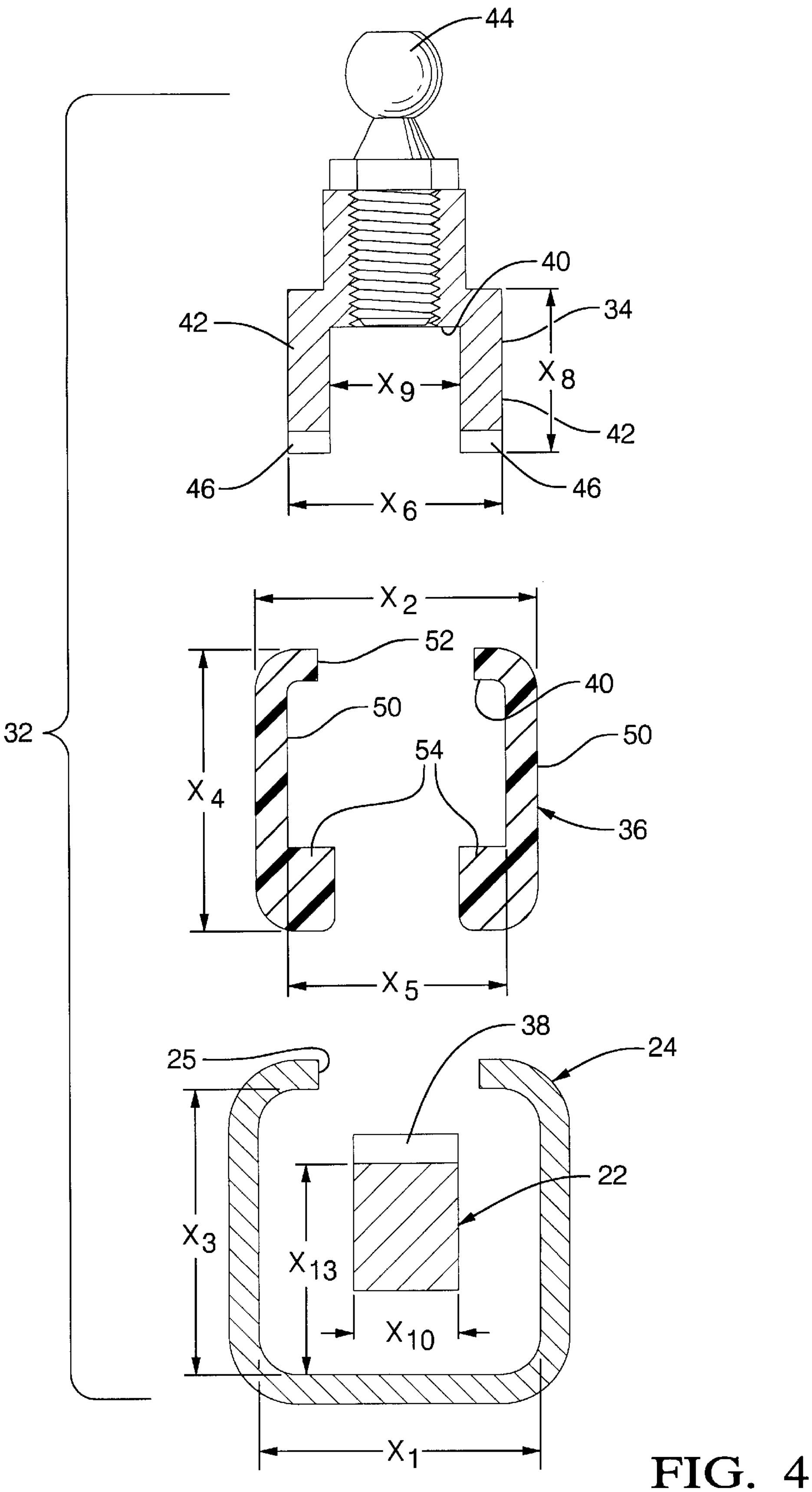
FIG. 4 is a cross sectional view of the various components of the assembly taken along the lines 4—4 in FIG. 3.

Referring next to FIGS. 3 and 4, a drive assembly indicated generally at 32 comprises, rack 22, channel track 24, as well as an included assemlby of a yoke, indicated generally at 34, and a bearing shoe, indicated generally at 36. Rack 22 is substantially narrower and thinner than the inside dimensions of channel track 24, and would be too narrow, barring other provisions, to be attached directly to lift rod 26. Still, it is sufficiently strong to withstand the axial driving loads from wheel 20. Rack 22 also has a notch 38 cut into its top edge, an edge that would normally be uninterrupted, with axially opposed ends defining a length of L1 for notch 38. Yoke 34 is formed from a suitable rigid metal, such as cast aluminum or steel, and is generally U shaped in cross section, with a top wall 40, depending side walls 42, and a ball stud 44 at the top that is sufficiently tall and narrow to extend out of channel track slot 25. The end to end length of top wall 40 L2 is substantially identical to the length L1 of rack notch 38. A pair of central notches 46 are cut into the bottom edges of yoke side walls 42. Shoe 36 is molded from a durable plastic material which provides good sliding wear resistance, but is still substantially lubricious, especially in sliding contact with steel, but also elastic enough to give slightly under twisting and compressive loading. Shoe 36 is also generally U shaped in cross section, with a top wall 48, depending side walls 50, and a window in top wall 48 through which ball stud 44 can extend. The end to end length L3 of shoe top wall 48 is substantially equal to the length L2 of yoke top wall 40. The lower edges of shoe side walls 50 are inturned slightly, with central, thickened tabs 54 sized to fit closely within the yoke side wall notches 46.

Referring next to FIG. 4, rack 22 is shown aligned within channel track 24, centered side to side, and in an up-down orientation that is designed to maintain its engagement with the toothed wheel 20. As noted above, it is the end bearing blocks 23 that maintain this nominal, ideal alignment, and the invention prevents any significant misalignment in operation. In general, a close fit of the outside of shoe 36 to the inside of channel track 24, combined with a close fit of the inside of shoe 36 to the outside of yoke 34 and a maintained clearance of the inside of yoke 34 from the outside of rack 22, all cooperate to allow the rack 22 to efficiently move rod 26, but so as to prevent rod 26 from undesirably re acting on rack 22. Specifically, this inter relationship is created by a complex interaction of various dimensions of rack 22, track channel track 24, yoke 34 and shoe 36, which allow the four components to cooperate as a single assembly 32, as described further below.

Figure 5:
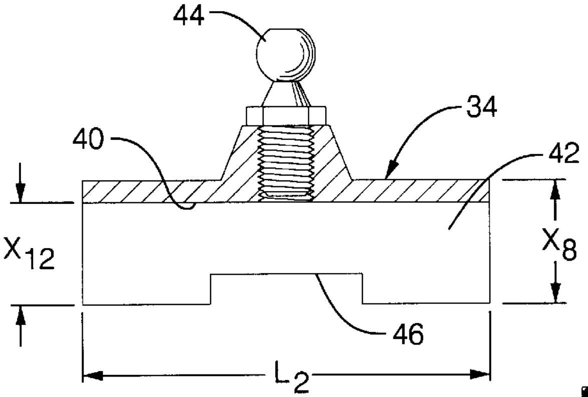
FIG. 5 is a cross sectional view of the yoke taken along the line 5—5 of FIG. 3.
Figure 6:
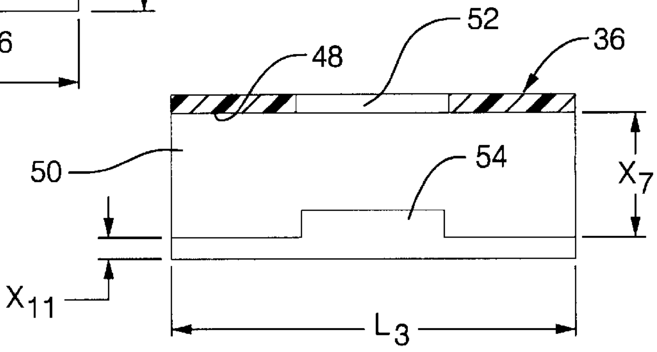
FIG. 6 is a cross sectional view of the show taken along the line 6—6 of FIG. 3.

Referring next to FIGS. 4 through 6, the various cooperating dimensions of the components are illustrated. The interior width X1 of channel track 24 is substantially identical to the exterior width X2 of shoe 36. The interior height of channel track 24 is substantially identical to the exterior height X4 or shoe 36. In short, the exterior surface of shoe 36 fits closely, but still slidably, with the interior surface of channel track 24. The interior width X5 of shoe 36 is substantially identical to the exterior width X6 of yoke 34. The interior height X7 of shoe 36, shown in FIG. 6, is substantially identical to the exterior height X8 of yoke 4. In short, the exterior surface of yoke 34 fits closely within the interior surface of shoe 36. There is no relative axial sliding between yoke 34 and shoe 36, however, because of the close fit of ball stud 44 through window 52, and the close fit of tabs 54 within notches 46. While channel track 24 and shoe 36, and yoke 34 and shoe 36, make a close fit, yoke 34 and rack 22 deliberately do not. The interior width X9 of yoke 34 is significantly larger than the exterior width X1O of rack 22, approximately 5 to 8 mm larger on each side. In addition to the side to side clearance of yoke 34 and rack 22, there is up down clearance. The thickness X11 of the inturned bottom edges of the shoe side walls 50 plus the interior height X12 of the yoke side walls 42 is greater, by a differential of approximately 2 to 3 mm, than the ideal height X13 of the bottom of rack notch 38 above the bottom of the interior of channel track 24. The ideal height X13 is maintained by the end bearing blocks 23, which keep toothed rack 22 aligned within channel track 24. This inter relationship of dimensions allows the components to be fitted together and cooperate as described next.

Figure 7:
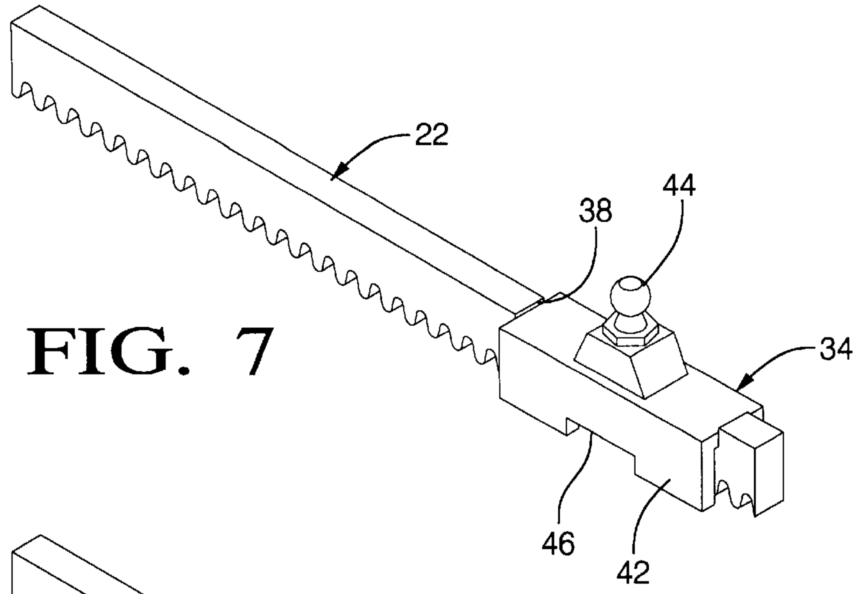
FIG. 7 shows the yoke fitted to the rack.
Figure 8:
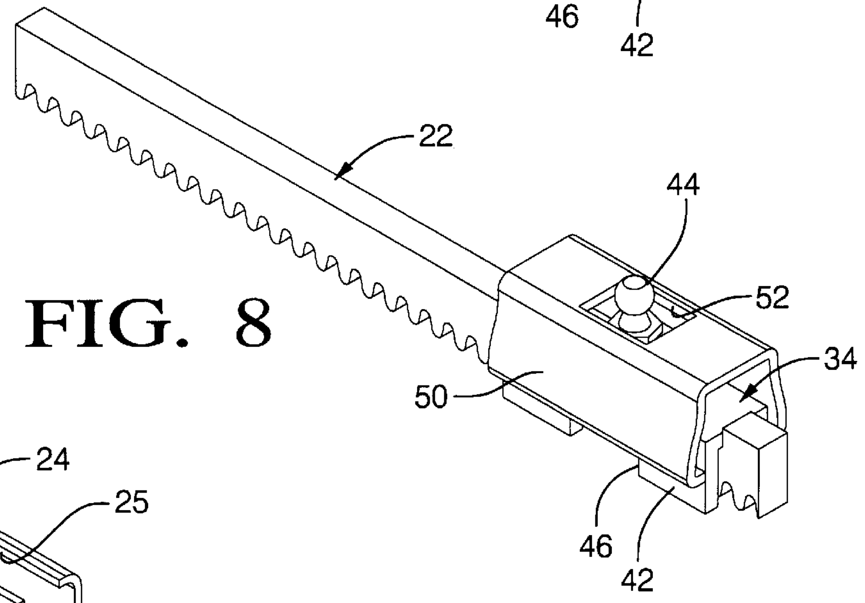
FIG. 8 shows the shoe being fitted over the yoke.
Figure 9:
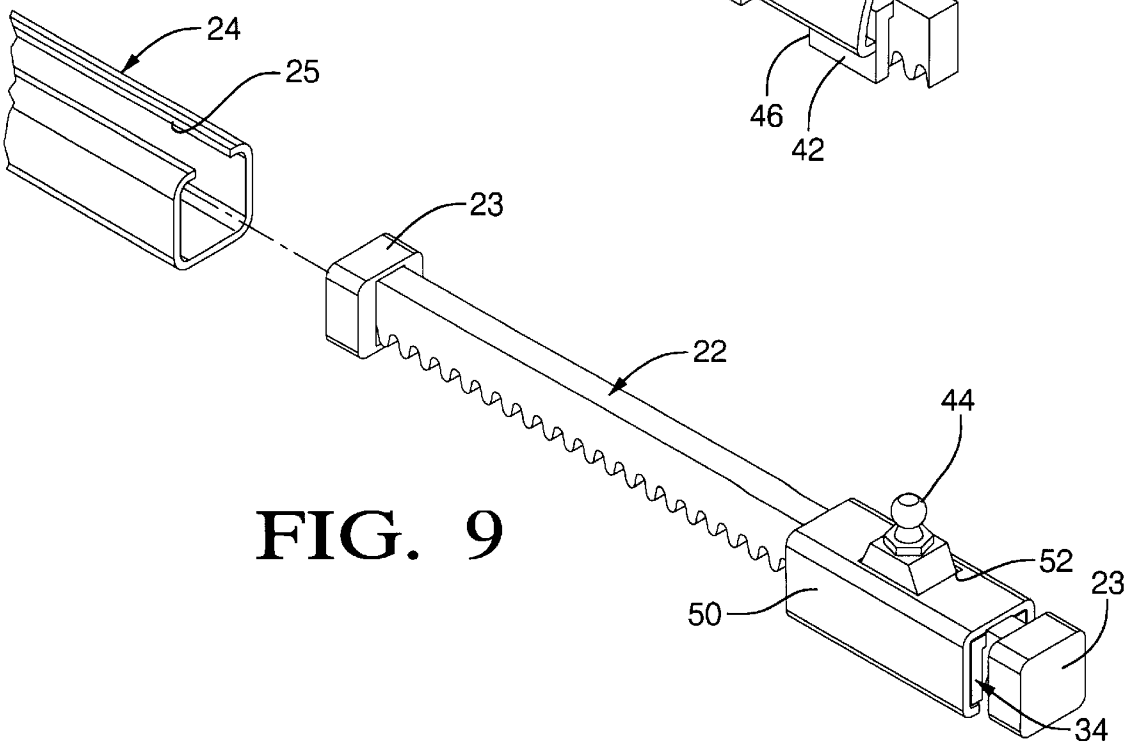
FIG. 9 shows the rack, shoe and yoke being installed into the channel track.

Referring next to FIGS. 7 through 9, a subassembly of rack 22, yoke 34, and shoe 36 is first built up as follows. Yoke 34 is sent into rack notch 38 as shown in FIG. 7. The matching of lengths L1 and L2 noted above prevents back and forth rattle between rack 22 and yoke 34, and notch 38 is deep enough that the ends of notch 38 overlap the ends of yoke top wall 40 sufficiently to establish an adequate, load transferring connection between the two. Next, as seen in FIG. 8, shoe 36 is snapped down over yoke 34, which the shoe side walls 50 are flexible enough to permit. The yoke side walls 42 are captured inside the shoe side walls 50, the shoe side wall tabs 54 are captured in the yoke side wall notches 46, and the yoke ball stud 44 is captured through the shoe window 52. Yoke 34 and shoe 36 are thereby held together as their own subassembly, though neither is yet held to the rack 22. Consequently, the shoe 36 could have been snapped over the yoke 34 before the yoke 34 was set down into the rack notch 38. Either way, the three make up another loosely held subassembly, as shown in FIG. 9. Next, this subassembly, with the bearing blocks 23 added to then ends of rack 22, is axially inserted within channel track 24, as shown by the arrow in FIG. 9, to complete the assembly 32. The end blocks 23, of course, could be attached to rack 22 at any point.

Referring back to FIGS. 1 and 2, with the assembly 32 described above completed, the motor 19 and toothed wheel 20 can be engaged with rack 22, and the lift rod lower socket joint 30 pivotally attached to the yoke ball stud 44. Finally, the completed actuator 18 would be installed to vehicle 10, and the upper socket joint 28 attached to the side of liftgate 14. As noted above, essentially all the components would most likely be installed inside suitable interior trim covers, so that only the channel track slot 25 and the ball stud 44-socket 30 joint would be visible.

Figure 10:
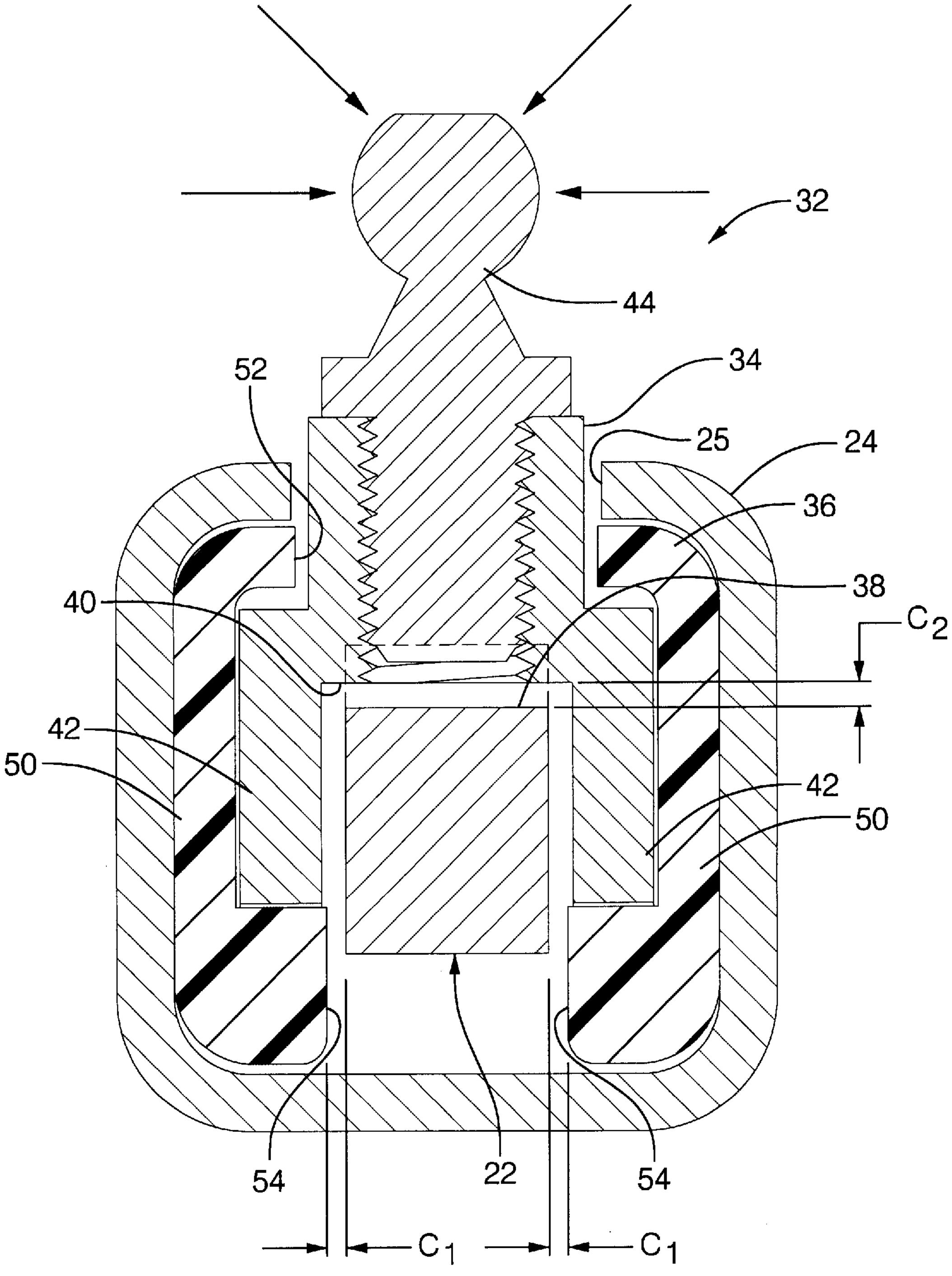
FIG. 10 shows a cross section through the completed assembly.

Referring next to FIG. 10, the inter relationship of the four components of rack 22, channel track 24, yoke 34 and shoe 36 within the completed assembly 32 is illustrated. In general, the outer surface of rack 22 has a clearance from the inner surface of yoke 34 maintained all the way around. Specifically, by virtue of the complex dimensional inter relationships described above, a side to side clearance C1 of approximately 5 to 8 mm and an up down clearance C2 of approximately 2 to 3 mm are maintained between the inner surface of yoke 34 and the outer surface of rack 22. This clearance is maintained all round, that is, everywhere in the area of notch 38 where yoke 34 straddles rack 22, but for the axial contact between the yoke 34 and the spaced ends of the rack notch 38. That axial contact is maintained by the alignment of rack 22 within track 24, as held by the end bearing blocks 23, and by the alignment of yoke 34 within track 24, as maintained by shoe 36. The net result is that the yoke top wall 40 is maintained seated down in the notch 38, solidly captured between the axially spaced ends of notch 38, as shown by the dotted line. This assures that as toothed rack 22 is run back and forth within channel track 24, the ends of the rack notch 38 push and pull back and forth on the rigid yoke 34 to adequately transfer axial force thereto and slide the ball stud 44 up and down in the slot 25, thereby moving lift rod 26 up and down. The reaction force of lift rod 26 back onto yoke ball stud 44 acts in widely varying directions, however, as shown by the arrows, not just axially along the channel track 24. This is why the pivotal connection between the lower end of rod 26 and rack 22 is needed.

The varying reactive force on the ball stud 44 creates twisting and tilting loads on yoke 34. In the case where the ball stud 44 is fixed directly to the top edge of rack 22, as is conventional, these non axial reactive loads are transferred directly to the rack 22, as noted above. With the subject invention, the outside of yoke 34 is instead twisted into the inside of shoe 36, which is ultimately twisted against the inner surface of channel track 24. Shoe 36, being an outer bearing layer of a suitable material different from yoke 34, does not bind, but continues to slide squarely and freely along the inside of channel track 24. The yoke 34 is sufficiently guided by the shoe 36, and the shoe 36 by the track 24, so that the inside of the yoke 34 does not twist or tilt enough to overcome either clearance C1 or C2 from the rack 22. In short, the desired axial, up and down loads are transferred between yoke 34 and rack 22, but the rack 22 is isolated from the undesired twisting and tilting reactive loads.

Variations in the disclosed embodiment could be made. A drive member other than toothed rack 22 could be moved by other means back and forth along the defined axis of the channel track 24. Regardless, the drive member will have to be joined to the lift rod 26 or other like end in such a way as to transfer axial loads. Yoke 34 could fit between two axially spaced stops on the rack 22 other than the ends of the notch 38. The notch 38 is easily manufactured, however. Yoke 34 and shoe 36 could be held together as an assembly by some other means than the snap fit of the tabs 54 into the notches 46. Fundamentally, a suitably sized bearing layer could even be molded in place over the outside of yoke 34, before or after the yoke 34 was installed between the stop members on rack 22. Yoke 34, fundamentally, has to serve as in inner, rigid, force transferring portion of the assembly, trapped between the stops on rack 22 and pivotally attached to the lower end of rod 26, so that it can efficiently transfer axial loads from actuator 19 into rod 26, but still kept clear of the rack 22 at points other than where it is captured between the axially spaced stops, so that it will not transfer non axial, reactive loads from rod 26 back into the rack 22. The particular shoe 36 and yoke 34 assembly disclosed is relatively easy to manufacture and install, however, especially the snap fit of the shoe 36 down over the yoke 34. A provision could also be made for some part of the shoe 36 to also retain to the rack 22, so long as the path of toothed wheel 20 along the bottom of rack 22 was not blocked. Therefore, it will be understood that it is not intended to limit the invention to just the embodiment disclosed.

What is claimed is:

1. A drive assembly for use in a vehicle having a closure panel that swings between an open and closed position, said drive assembly comprising:

a link having a first end attachable to the closure panel and an opposed second end that is driven back and forth along a defined axis;

a power actuator;

a channel track having an end to end extent oriented along said defined axis and an inner surface with a regular cross section along it length;

a drive member aligned with said channel track and drivingly engaged with said power actuator, for axially back and forth movement within said channel track;

a pair of axially opposed stops on said drive member, a yoke-shoe assembly having a rigid inner portion that is pivotally attached to said link second end and which is closely captured between said drive member stop members to maintain a clearance between said rigid inner portion and the rest of said drive member, said yoke-shoe assembly also having an outer bearing layer that is closely slidably captured within the inner surface of said channel track, whereby, as said power actuator moves said drive member axially back and forth within said channel track, axial loads are transferred between from said drive member to said yoke-shoe assembly rigid inner portion and link by said axially spaced stop members, while non axial reactive loads from said link into said yoke shoe assembly inner portion are isolated from said drive member by said maintained clearance.

2. A drive assembly according to claim 1, further characterized in that said drive member is a toothed rack driven by a toothed wheel within said channel track.

3. A drive assembly according to claim 2, further characterized in that said pair of axially opposed stops comprise the axially spaced ends of a notch in said toothed rack.

4. A drive assembly according to claim 3, further characterized in that said yoke-shoe assembly comprises a rigid yoke that fits closely within said toothed rack notch opposed ends, while having a clearance elsewhere from said toothed rack, and a shoe that fits closely over the outer surface of said yoke and closely within the inner surface of said channel track, so as to maintain said clearance.

* * * * *